(12) United States Patent
Jung et al.

(10) Patent No.: US 11,709,705 B2
(45) Date of Patent: Jul. 25, 2023

(54) EVENT PROXIES FOR FUNCTIONS-AS-A-SERVICE (FAAS) INFRASTRUCTURES

(71) Applicant: VMware, Inc., Palo Alto, CA (US)

(72) Inventors: Berndt Jung, Redwood City, CA (US); Mark Peek, Belmont, CA (US); Karol Stepniewski, Santa Clara, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 17/510,148

(22) Filed: Oct. 25, 2021

(65) Prior Publication Data
US 2022/0043676 A1 Feb. 10, 2022

Related U.S. Application Data

(63) Continuation of application No. 16/244,983, filed on Jan. 10, 2019, now Pat. No. 11,182,206.

(51) Int. Cl.
*G06F 9/48* (2006.01)
*H04L 67/10* (2022.01)
*H04L 67/306* (2022.01)
*G06F 9/54* (2006.01)

(52) U.S. Cl.
CPC .......... *G06F 9/4881* (2013.01); *G06F 9/542* (2013.01); *H04L 67/10* (2013.01); *H04L 67/306* (2013.01)

(58) Field of Classification Search
CPC ........ G06F 9/4881; G06F 9/542; G06F 9/541; H04L 67/10; H04L 67/306; H04L 67/535; H04L 67/565; H04L 67/60
See application file for complete search history.

(56) References Cited

U.S. PATENT DOCUMENTS

| 10,671,360 | B1 | 6/2020 | Todd et al. |
| 2016/0057211 | A1* | 2/2016 | Thapliyal ............... H04L 67/02 709/203 |
| 2017/0295254 | A1* | 10/2017 | Moothoor ............ H04L 67/566 |
| 2018/0255095 | A1 | 9/2018 | Doron et al. |
| 2018/0307692 | A1 | 10/2018 | Yuan |
| 2018/0375712 | A1 | 12/2018 | Krohling et al. |
| 2019/0012218 | A1 | 1/2019 | Rimac et al. |

(Continued)

OTHER PUBLICATIONS

Non-Final Office Action dated Dec. 8, 2018; U.S. Appl. No. 16/244,983; (16 pgs.)

(Continued)

*Primary Examiner* — Jorge A Chu Joy-Davila (57) ABSTRACT

Techniques for implementing event proxies in a Functions-as-a-Service (FaaS) infrastructure are provided. In one set of embodiments, a computer system implementing an event proxy can receive an event emitted by an event source, where the computer system is part of a first computing cloud including the FaaS infrastructure, and where the event source is a software service running in a second computing cloud that is distinct from the first computing cloud. The computer system can translate the event from a first format understood by the event source to a second format understood by a function scheduler of the FaaS infrastructure, where the function scheduler is configured to schedule execution of functions on hosts of the FaaS infrastructure. The computer system can then make the translated event available to the function scheduler.

21 Claims, 4 Drawing Sheets

(56) References Cited

U.S. PATENT DOCUMENTS

| | | |
|---|---|---|
| 2019/0042315 A1 | 2/2019 | Smith et al. |
| 2019/0045037 A1* | 2/2019 | Sukhomlinov ..... H04L 12/4633 |
| 2019/0141119 A1 | 5/2019 | Bernat et al. |
| 2019/0377604 A1 | 12/2019 | Cybulski |
| 2020/0225982 A1 | 7/2020 | Jung et al. |
| 2021/0263779 A1* | 8/2021 | Haghighat ............ G06F 9/5061 |

OTHER PUBLICATIONS

Final Office Action dated May 21, 2021; U.S. Appl. No. 16/244,983; (17pgs.)
Notice of Allowance dated Aug. 5, 2021; U.S. Appl. No. 16/244,983; (13 pgs.)

* cited by examiner

EVENT PROXIES FOR FUNCTIONS-AS-A-SERVICE (FAAS) INFRASTRUCTURES

CROSS-REFERENCES TO RELATED APPLICATIONS

The present application is a continuation of U.S. application Ser. No. 16/244,983 filed Jan. 10, 2019, now U.S. Pat. No. 11,182,206 issued Nov. 23, 2021, entitled "Event Proxies For Functions-as-a Service (FaaS) Infrastructures." The entire contents of this application are incorporated herein by reference for all purposes.

BACKGROUND

Functions-as-a-service (FaaS) is a computing model in which application developers upload modular chunks of application functionality, referred to as functions, to a cloud-based FaaS infrastructure. Once uploaded, a service layer of the FaaS infrastructure schedules and executes the functions on-demand (e.g., at the time of function invocation) on servers (i.e., hosts) of the infrastructure in an independent and scalable manner.

FaaS can be implemented using private clouds or public clouds. A private cloud-based FaaS infrastructure is typically owned and operated by a single organization (using, e.g., the organization's on-premise server resources) for sole use by that organization. In contrast, a public cloud-based FaaS infrastructure is owned and operated by a third-party cloud service provider and is made available for use by various customers (e.g., organizations, application developers, etc.). Since customers are not responsible for operating/managing the server hardware of a public cloud, this is sometimes refers to as a "serverless" solution.

Generally speaking, functions that run on a FaaS infrastructure are subject to restrictions when it comes to local (i.e., machine/instance-bound) state. Examples of local state include variables stored in system memory and data written to a local disk. Because functions can be instantiated and run on any host in a FaaS infrastructure, there is no guarantee that the local state created/modified by one instance of a function will be available to another instance of the same function. Thus, in order for functions to make use of state that persists beyond the lifetime of a single function instance, the functions must generally rely on external services (e.g., databases, cloud-based object stores, etc.) that can create and manage such state outside of the context of individual function instances.

In public clouds that implement FaaS, the cloud service provider usually provides these types of external services, in addition to the FaaS service, as part of an integrated service suite to customers. As a result, functions running on the FaaS infrastructure of the public cloud can easily interoperate with the external services (which are running on the same public cloud) to access/create/modify persistent state. The interoperation between the FaaS service and the external services is generally enabled via an event-based communication model that relies on an event bus interconnecting the various services of the public cloud.

On the other hand, in private clouds that implement FaaS, the FaaS service is often the only provided service. Thus, functions running on a private cloud-based FaaS infrastructure generally do not have the ability to leverage external services within the same cloud for persistent state access/management.

SUMMARY

Techniques for implementing event proxies in a Functions-as-a-Service (FaaS) infrastructure are provided. In one set of embodiments, a computer system implementing an event proxy can receive an event emitted by an event source, where the computer system is part of a first computing cloud including the FaaS infrastructure, and where the event source is a software service running in a second computing cloud that is distinct from the first computing cloud. The computer system can translate the event from a first format understood by the event source to a second format understood by a function scheduler of the FaaS infrastructure, where the function scheduler is configured to schedule execution of functions on hosts of the FaaS infrastructure. The computer system can then make the translated event available to the function scheduler.

The following detailed description and accompanying drawings provide a better understanding of the nature and advantages of particular embodiments.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

1. Overview

Embodiments of the present disclosure are directed to techniques for implementing event proxies in a FaaS infrastructure. As used herein, an event proxy is a process that can interact with an event source (such as, e.g., an external service) for the purpose of relaying events between the event source and functions implemented via the FaaS infrastructure. For example, according to one set of embodiments, the event proxy can (1) receive events emitted by the event source, (2) translate the events into a format understood by a function scheduler of the FaaS infrastructure, and (3) output the translated events for placement on a local event bus. Once a translated event is placed on the local event bus, the function scheduler can retrieve the event from the event bus and can identify a function that is subscribed to the event (or to the event's type). This subscription can indicate, for instance, that the function should be invoked upon event occurrence and that the event should be passed as an input parameter to the function. The function scheduler can then schedule the function for execution on a host of the FaaS infrastructure in response to the event.

Significantly, the event proxies of the present disclosure can interact with event sources that are running in completely separate clouds from the cloud in which the event proxies are implemented. For instance, an event proxy implemented in a FaaS infrastructure of a private cloud can interact with (e.g., receive events from) an event source running in a public cloud. This allows the event proxy to act as a bridge between the two clouds for event-based communication, despite the lack of a common event bus between the two. By way of example, in the scenario where the event source is an external service configured to manage persistent state in the public cloud (e.g., an object-based storage service), the event proxy allows functions running in the private cloud to be triggered by and/or consume events that reflect persistent state changes in the public cloud.

The foregoing and other aspects of the present disclosure are described in further detail below.

2. FaaS Infrastructure

Figure 1:
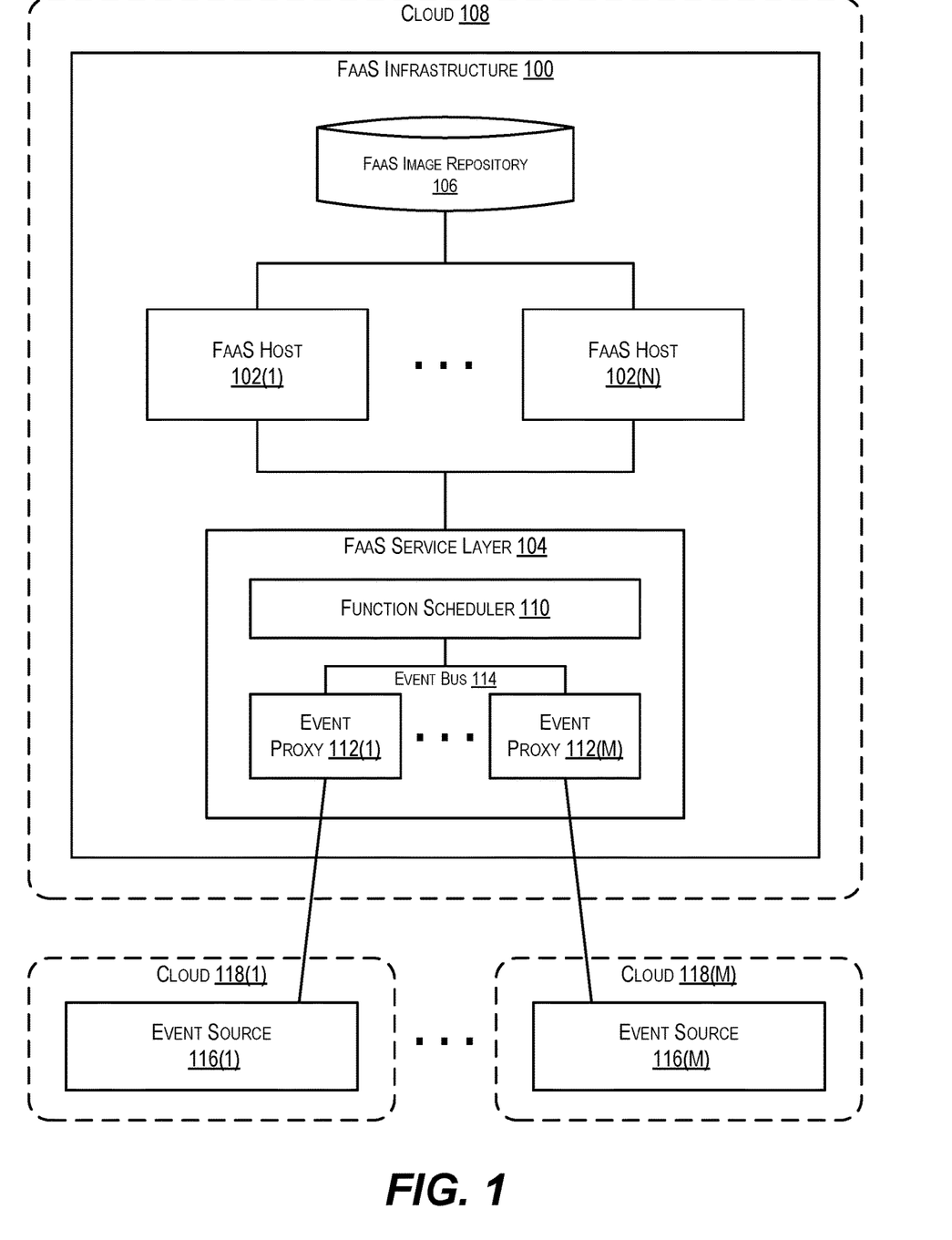
FIG. 1 depicts a FaaS infrastructure that implements event proxies according to an embodiment.

FIG. 1 depicts a FaaS infrastructure 100 that implements event proxies in accordance with embodiments of the present disclosure. As shown, FaaS infrastructure 100 is a computing platform that includes a plurality of FaaS hosts 102(1)-(N) communicatively coupled with a FaaS service layer 104 and a FaaS image repository 106. FaaS infrastructure components 102, 104, and 106 are implemented via a cloud 108. As used herein, a "cloud" (also referred to as a "computing cloud") is a pool of computing resources operated/managed by one or more entities. In one set of embodiments, cloud 108 may be a private cloud and thus may comprise on-premise computing resources operated and managed by a particular organization using the cloud. In other embodiments, cloud 108 may be a public cloud and thus may comprising publically-accessible computing resources operated and managed by a third-party cloud service provider. Examples of such third-party cloud service providers include Amazon, Microsoft, Google, and so on.

In practice, application developers that wish to leverage FaaS infrastructure 100 can create and upload functions to infrastructure 100 that correspond to modular portions of functionality in their applications. For example, one such function may encapsulate program code for extracting data from a file, another such function may encapsulate program code for processing the extracted data in a certain way, and so on. These functions are maintained by FaaS infrastructure 100 in the form of function runtime images (which may be, e.g., executable files, container images, virtual machine images, etc.) in FaaS image repository 106.

When an application that makes use of an uploaded function is run, a function scheduler 110 of FaaS service layer 104 can receive an invocation request for that function (or detect the occurrence of an event that triggers function invocation) and can select one of FaaS hosts 102(1)-(N) for executing the function. The selected FaaS host can then retrieve the image for the invoked function from FaaS image repository 106, load/initialize the function image in its primary memory (thereby creating an instance of the function in the primary memory), and execute the function instance.

As noted the Background section, functions that are designed for use in a FaaS infrastructure such as infrastructure 100 cannot rely on local (i.e., machine or instance-bound) state. This is because such functions may be scheduled for execution on any FaaS host of the infrastructure, and thus there is no guarantee that the local state created/modified by one function instance will be available to another function instance. Accordingly, in order to carry out stateful operations, FaaS functions must generally rely on external services that provide persistent state access/management (e.g., cloud-based object storage services, databases, etc.).

In public clouds that implement FaaS functionality, the third-party provider/operator of the public cloud often provides such external services along with the FaaS service as part of an integrated service suite. For instance, Amazon provides both AWS Lambda (a FaaS service) and S3 storage (an object-based storage service) to its customers, and implements an event-based communication model that enables these two services to communicate. Thus, functions that are executed via AWS Lambda can easily consume events from S3 storage and thereby implement logic that is based on persistent state changes in S3.

By way of example, consider an AWS Lambda function F that is designed to perform an image resize operation on photos that have been uploaded to S3 storage. In this scenario, a user can upload a photo to his/her particular bucket on S3 storage, and in response the S3 storage service can emit an event indicating that the photo has been uploaded. This event can be placed on an event bus that is common to all of the services in the Amazon public cloud. The AWS Lambda service can detect the emitted event and determine that function F is subscribed to (i.e., is configured to consume) this event. The AWS Lambda service can then invoke or otherwise notify function F and provide the event to F, which can retrieve the photo from the S3 storage location per the event details and perform the resize operation on the image data.

In contrast to public clouds, private clouds that implement FaaS functionality are often specialized for this one task and thus do not provide any external services within the same cloud that FaaS functions can leverage for persistent state access/management. Accordingly, image resize function F described above is significantly more difficult to implement in a private cloud-based FaaS infrastructure.

To address this and other similar issues, FaaS infrastructure 100 of FIG. 1 has been enhanced to include, within FaaS service layer 104, one or more event proxies 112(1)-(M) and an event bus 114 interconnecting event proxies 112(1)-(M) with function scheduler 110. Each event proxy 112 is a long-lived software process that communicates with a corresponding event source 116 implemented/running in distinct clouds 118(1)-(M). Event sources 116(1)-(M) can be, e.g., external services that provide persistent state access/management, such as cloud-based object stores, databases, or the like. Alternatively, event sources 116(1)-(M) can be any type of software service that generates events and/or performs operations of interest to functions running on FaaS infrastructure 100.

At a high level, event proxies 112(1)-(M) act as a bridge between event sources 116(1)-(M) and FaaS infrastructure 100, thereby enabling the functions running on FaaS infrastructure 100 to consume events from, and potentially emit events to, event sources 116(1)-(M), despite the lack of a common event bus linking cloud 108 with clouds 118(1)-(M). Stated another way, event proxies 112(1)-(M) allow events to be communicated between services in two completely separate and distinct computing clouds. This results in a number of benefits. For example, in the scenario where cloud 108 of FIG. 1 is a private cloud that does not provide any external services beyond FaaS service 104, event proxies 112(1)-(M) can enable the functions of FaaS infrastructure 100 to implement logic that is reliant on persistent state managed by external storage services running in one or more public clouds separate from the private cloud. This is because event proxies 112(1)-(M) can deliver state-related events generated by these external storage services (corresponding to event sources 116(1)-(M)) to functions within cloud 108 that have subscribed to the events.

Further, in the scenario where cloud 108 of FIG. 1 is a public cloud, event proxies 112(1)-(M) can enable the functions of FaaS infrastructure 100 to implement logic that is reliant on events generated by external services running in one or more other public clouds. Thus, event proxies 112(1)-(M) can facilitate event-based communication across different public clouds. For example, assume cloud 108 is an Amazon public cloud and FaaS infrastructure 100 is AWS Lambda. In this case, the event proxies can enable AWS Lambda functions running on FaaS infrastructure 100 to consume events generated by services running in a Microsoft public cloud, a Google public cloud, or the like.

Yet further, in some embodiments event proxies 112(1)-(M) can act as a proxy for external services that traditionally do not emit events on their own, such as relational databases. In these embodiments, an event proxy can be configured to emit an event for placement on event bus 114 upon the detection of a particular trigger operation in the external service (e.g., creation of table, insertion of row, etc.). This enables functions implemented in FaaS infrastructure 100 to subscribe to and consume events pertaining to external services whose operations are of interest to the functions, but do not follow an event-based communication paradigm.

Workflows that provide additional details regarding the creation and operation of event proxies 112(1)-(M) are presented in the sections that follow. It should be appreciated that the diagram of FIG. 1 is illustrative and not intended to limit embodiments of the present disclosure. For example, although FIG. 1 depicts a particular arrangement of entities/components, other arrangements or configurations are possible depending on the specific deployment. Further, the various entities/components shown may have subcomponents or functions that are not specifically described. One of ordinary skill in the art will recognize other variations, modifications, and alternatives.

3. Event Proxy Creation

Figure 2:
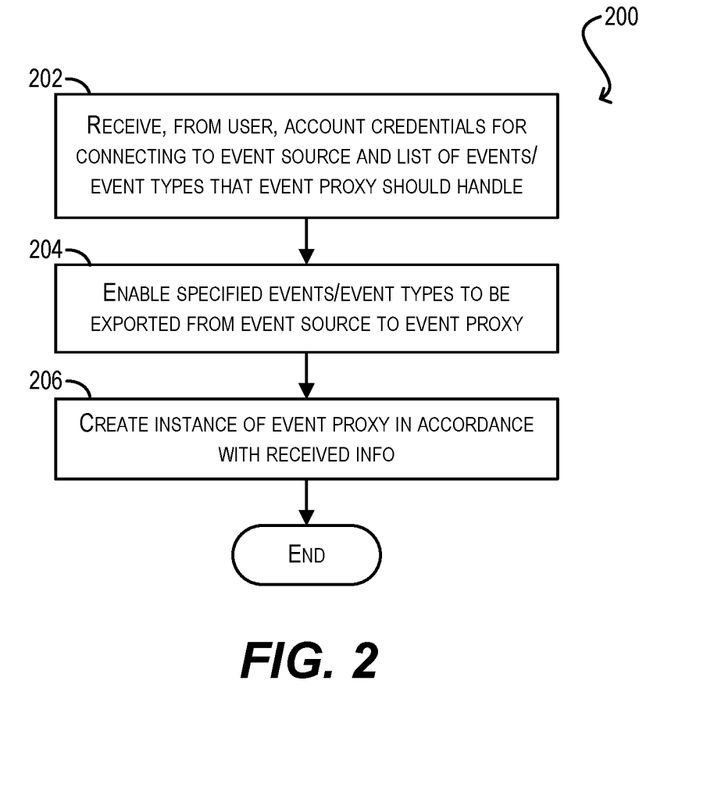
FIG. 2 depicts a workflow for creating an event proxy according to an embodiment.

FIG. 2 depicts a workflow 200 that can be executed by FaaS service layer 104 of FIG. 1 for creating a new event proxy 112 for an event source 116 according to an embodiment.

Starting with block 202, FaaS service layer 104 can receive, from a user (e.g., an administrator of FaaS infrastructure 100), account credentials for connecting to event source 116 (which may be, e.g., an external service such as a cloud-based object storage service) and a list of events or event types generated by the event source that the event proxy is configured to handle. For example, in the case where the event source is an object-based storage service, the user-defined events/event types may include events indicating the creation of a new object, the deletion of an object, the modification of an object, etc.

At block 204, FaaS service layer 104 can take appropriate steps for enabling the events/event types to be exported from the event source to the event proxy. The exact nature of these steps will vary depending on the nature of the event source and/or the computing cloud hosting the event source. For example, according to one set of embodiments, these steps may involve calling one or more application programming interfaces (APIs) that cause the event source to push events (as they are emitted) to the event proxy. According to another set of embodiments, these steps may involve creating a local event server to poll for events on a periodic basis from the event source.

Finally, at block 206, FaaS service layer 104 can create an instance of the event proxy in accordance with the information received at block 202. The event proxy instance can connect with the event source via the received account credentials and begin receiving events from the event source as they are emitted.

As mentioned previously, in certain embodiments the "event source" mapped to the event proxy may not be a service that actually emits events; instead, the event source may simply be some software component or service that carries out operations of interest to functions in FaaS infrastructure 100. For example, the software component/service may be a traditional relational database, which carries out storage operations but does not emit events like a cloud-based storage service. Accordingly, for these types of software components, workflow 200 of FIG. 2 may be modified to receive, from the user, a list of one or more operations at the event source that should trigger the generation of an event by the event proxy (e.g., creation of a new DB table, insertion of a new row, etc.). Using this list, the instantiated event proxy can monitor for the occurrence of the specified operations and generate events accordingly (rather than receiving events from the event source).

4. Event Handling for Inbound Events

Figure 3:
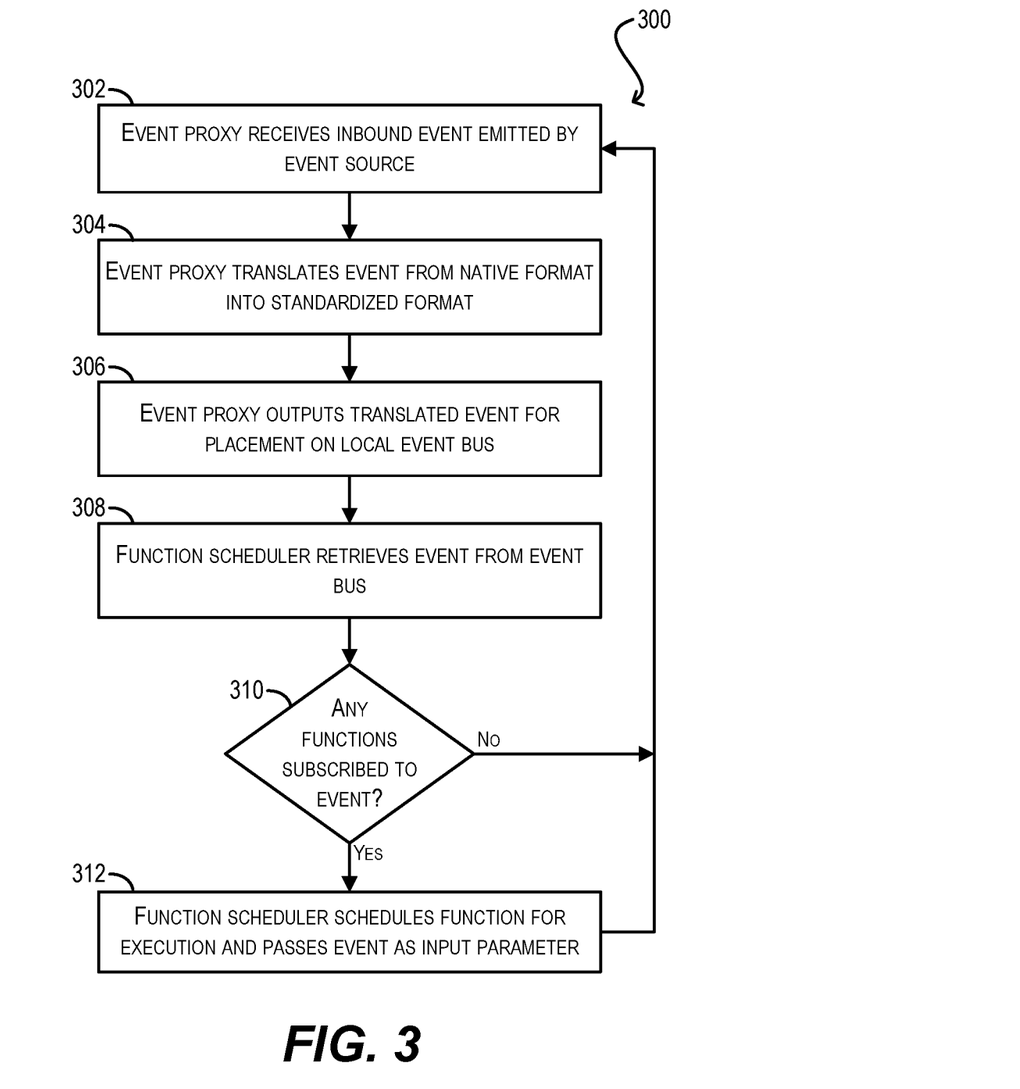
FIG. 3 depicts a workflow for handling inbound events via an event proxy according to an embodiment

FIG. 3 depicts a workflow 300 that may be performed by an event proxy 112 and function scheduler 110 of FaaS service layer 104 for handling inbound events (e.g., events emitted by the proxy's corresponding event source 116) according to an embodiment. Workflow 300 assumes that the event proxy has been instantiated and configured to receive a predefined list of events or event types from the event source per workflow 200 of FIG. 2.

At block 302, the event proxy can receive an event that has been emitted by the event source. As noted above, the event proxy may receive this event from the event source via either a push or pull mechanism. Alternatively, in embodiments where the event proxy is configured to monitor for certain "trigger" operations in the event source, the proxy can detect the occurrence of such a trigger operation and locally generate the event.

Assuming the event is received from the event source, at block 304 the event proxy can translate the received event from its native format (i.e., the format used by the event source) into a standardized format understood by FaaS service layer 104. This ensures that the content of the event can be recognized by function scheduler 110 and the functions in FaaS infrastructure 100, regardless of who originally generated the event. Upon translating the event, the event proxy can output it to FaaS service layer 104, which can place the translated event on event bus 114 (block 306).

At blocks 308 and 310, function scheduler 110 can retrieve the translated event from event bus 114 and check whether any functions uploaded to FaaS infrastructure 100 have subscribed to this particular event or event type. In various embodiments, such a subscription can indicate that the subscribing function should be invoked at the time the event is detected. Thus, if there is a function that has subscribed to the event, function scheduler 110 can schedule that function for execution on a FaaS host of the infrastructure and provide the event as an input parameter to the function (thereby allowing the function to consume the event as part of its execution) (block 312).

Then, once the function has been scheduled for execution (or function scheduler 110 determines that there are no subscribing functions), workflow 300 can return to block 302 in order to handle further incoming events from the event source.

5. Event Handling for Outbound Events

Figure 4:
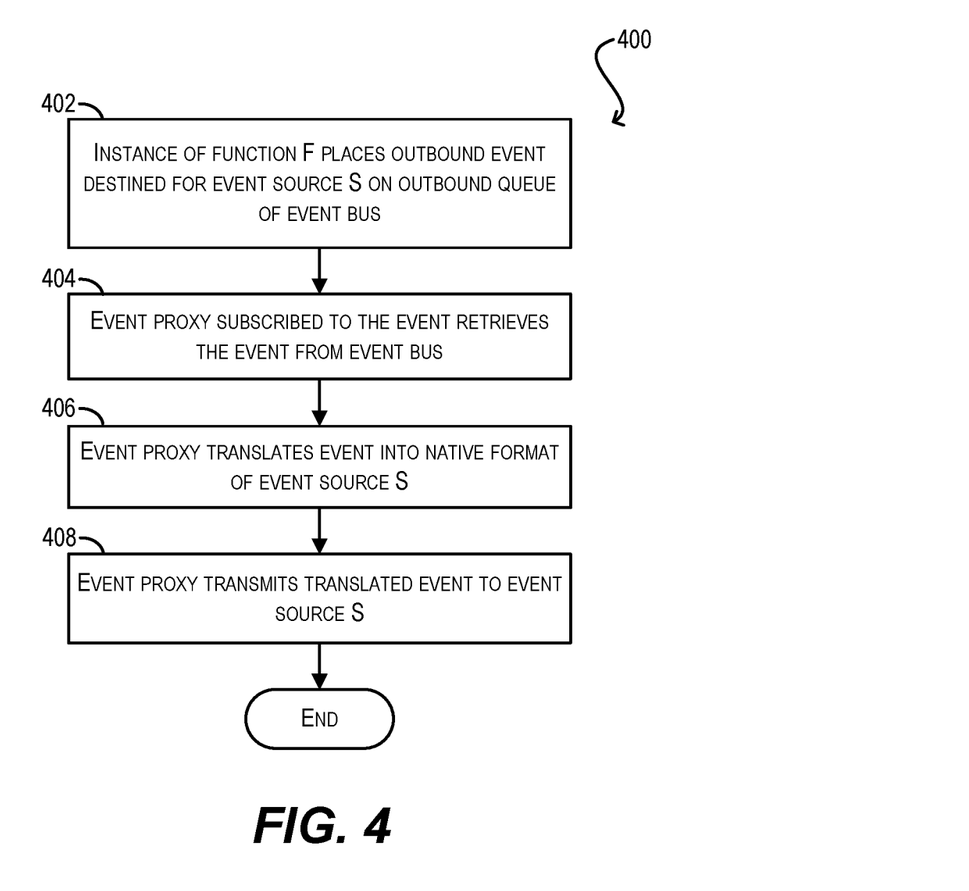
FIG. 4 depicts a workflow for handling outbound events via an event proxy according to an embodiment.

In some embodiments, in addition to handling incoming events from an event source, an event proxy can also handle outgoing events generated by a function and deliver the outgoing events to one or more event sources. Examples of such outgoing events can include the results of function execution, an instruction to perform some action (e.g., write data to some location), an acknowledgement or error message, and so on. FIG. 4 depicts a workflow 400 for implementing this outbound event handling according to an embodiment.

Starting with block 402, an executing instance of a function F can place an outbound event destined for a particular event source S on an outbound queue of event bus 114. This outbound event can include informational content regarding the event, as well as details (e.g., account credentials) for communicating with destination event source S.

At a later point in time (either immediately after block 402 or some time afterward, potentially after the function instance has finished its execution), an event proxy that has subscribed to the outbound event can retrieve the event from the outbound queue (block 404) and translate the event into the native format understood by event source S (block 406).

Finally, at block 408, the event proxy can transmit the translated event to event source S using the connection details included in the event. It should be noted that destination event source S may not necessarily be the same event source(s) from which function F consumes events. For example, function F may consume inbound events from one event source while generating outbound events destined for a completely different event source.

Certain embodiments described herein involve a hardware abstraction layer on top of a host computer. The hardware abstraction layer allows multiple containers to share the hardware resource. These containers, isolated from each other, have at least a user application running therein. The hardware abstraction layer thus provides benefits of resource isolation and allocation among the containers. In the foregoing embodiments, virtual machines are used as an example for the containers and hypervisors as an example for the hardware abstraction layer. As described above, each virtual machine includes a guest operating system in which at least one application runs. It should be noted that these embodiments may also apply to other examples of containers, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

Further embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Yet further, one or more embodiments can relate to a device or an apparatus for performing the foregoing operations. The apparatus can be specially constructed for specific required purposes, or it can be a general purpose computer system selectively activated or configured by program code stored in the computer system. In particular, various general purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

In addition, while described virtualization methods have generally assumed that virtual machines present interfaces consistent with a particular hardware system, persons of ordinary skill in the art will recognize that the methods described can be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, certain virtualization operations can be wholly or partially implemented in hardware.

Many variations, modifications, additions, and improvements are possible, regardless the degree of virtualization. The virtualization software can therefore include components of a host, console, or guest operating system that performs virtualization functions. Plural instances can be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments, and are presented to illustrate the flexibility and advantages of particular embodiments as defined by the following claims. Other arrangements, embodiments, implementations and equivalents can be employed without departing from the scope hereof as defined by the claims.

What is claimed is:

1. A method comprising:
receiving, by a service layer of a Functions-as-a-Service (FaaS) infrastructure in a first computing cloud, information pertaining to a plurality of event sources running in a plurality of second computing clouds distinct from the first computing cloud, the information including, for each event source, account credentials for connecting to the event source and a list of event types emitted by the event source;
instantiating, by the service layer based on the received information, a plurality of event proxies in the FaaS infrastructure corresponding to the plurality of event sources, wherein the plurality of event proxies are long-lived software processes that are communicatively coupled with an event bus of the FaaS infrastructure and wherein the instantiating includes, for each event proxy:
connecting the event proxy to its respective event source using the respective event source's account credentials;
subscribing the event proxy to inbound events from the respective event source that are of a type in the respective event source's list of event types; and
subscribing the event proxy to outbound events from the FaaS infrastructure that are destined for the respective event source; and
at a time a function of the FaaS infrastructure generates an outbound event destined for a first event source in the plurality of event sources:
retrieving, by a first event proxy in the plurality of event proxies that corresponds to the first event source, the outbound event from an outbound queue of the event bus;
translating, by the first event proxy, the outbound event into a format understood by the first event source; and
transmitting, by the first event proxy, the translated outbound event to the first event source in its respective second computing cloud.

2. The method of claim 1 wherein the outbound event was placed in the outbound queue by the function in response to receiving an inbound event originating from the first event source.

3. The method of claim 2 wherein the outbound event includes a result of an execution of the function with respect to the inbound event.

4. The method of claim 1 wherein the outbound event was placed in the outbound queue by the function in response to receiving an inbound event originating from a second event source in another of the second computing clouds that is different from the first event source.

5. The method of claim 1 wherein the outbound event includes an instruction to write data to one or more storage locations in the second computing cloud of the first event source.

6. The method of claim 1 further comprising:
receiving an inbound event emitted by the first event source;
translating the inbound event from the format understood by the first event source to another format understood by a function scheduler of the FaaS infrastructure; and
placing the translated inbound event in an inbound queue of the event bus.

7. The method of claim 6 wherein, upon detecting the translated inbound event in the inbound queue, the function scheduler:
identifies the function as being subscribed to the translated inbound event or a type of the translated inbound event; and
schedules the function for execution, the scheduling comprising passing the translated inbound event as an input parameter to the function.

8. A non-transitory computer readable storage medium having stored thereon program code executable by a service layer of a Functions-as-a-Service (FaaS) infrastructure in a first computing cloud, the program code embodying a method comprising:
receiving information pertaining to a plurality of event sources running in a plurality of second computing clouds distinct from the first computing cloud, the information including, for each event source, account credentials for connecting to the event source and a list of event types emitted by the event source; and
instantiating, based on the received information, a plurality of event proxies in the FaaS infrastructure corresponding to the plurality of event sources, wherein the plurality of event proxies are long-lived software processes that are communicatively coupled with an event bus of the FaaS infrastructure and wherein the instantiating includes, for each event proxy:
connecting the event proxy to its respective event source using the respective event source's account credentials;
subscribing the event proxy to inbound events from the respective event source that are of a type in the respective event source's list of event types; and
subscribing the event proxy to outbound events from the FaaS infrastructure that are destined for the respective event source,
wherein at a time a function of the FaaS infrastructure generates an outbound event destined for a first event source in the plurality of event sources, a first event proxy in the plurality of event proxies that corresponds to the first event source:
    retrieves the outbound event from an outbound queue of the event bus;
    translates the outbound event into a format understood by the first event source; and
    transmits the translated outbound event to the first event source in its respective second computing cloud.

9. The non-transitory computer readable storage medium of claim 8 wherein the outbound event was placed in the outbound queue by the function in response to receiving an inbound event originating from the first event source.

10. The non-transitory computer readable storage medium of claim 9 wherein the outbound event includes a result of an execution of the function with respect to the inbound event.

11. The non-transitory computer readable storage medium of claim 8 wherein the outbound event was placed in the outbound queue by the function in response to receiving an inbound event originating from a second event source in another of the second computing clouds that is different from the first event source.

12. The non-transitory computer readable storage medium of claim 8 wherein the outbound event includes an instruction to write data to one or more storage locations in the second computing cloud of the first event source.

13. The non-transitory computer readable storage medium of claim 8 wherein the first event proxy further:
    receives an inbound event emitted by the first event source;
    translates the inbound event from the format understood by the first event source to another format understood by a function scheduler of the FaaS infrastructure; and
    places the translated inbound event in an inbound queue of the event bus.

14. The non-transitory computer readable storage medium of claim 13 wherein, upon detecting the translated inbound event in the inbound queue, the function scheduler:
    identifies the function as being subscribed to the translated inbound event or a type of the translated inbound event; and
    schedules the function for execution, the scheduling comprising passing the translated inbound event as an input parameter to the function.

15. A computer system executing a service layer of a Functions-as-a-Service (FaaS) infrastructure in a first computing cloud, the computer system comprising:
    a processor; and
    a non-transitory computer readable medium having stored thereon program code that, when executed by the processor, causes the processor to:
        receive information pertaining to a plurality of event sources running in a plurality of second computing clouds distinct from the first computing cloud, the information including, for each event source, account credentials for connecting to the event source and a list of event types emitted by the event source; and
        instantiate, based on the received information, a plurality of event proxies in the FaaS infrastructure corresponding to the plurality of event sources, wherein the plurality of event proxies are long-lived software processes that are communicatively coupled with an event bus of the FaaS infrastructure and wherein the instantiating includes, for each event proxy:
            connecting the event proxy to its respective event source using the respective event source's account credentials;
            subscribing the event proxy to inbound events from the respective event source that are of a type in the respective event source's list of event types; and
            subscribing the event proxy to outbound events from the FaaS infrastructure that are destined for the respective event source,
    wherein at a time a function of the FaaS infrastructure generates an outbound event destined for a first event source in the plurality of event sources, a first event proxy in the plurality of event proxies that corresponds to the first event source:
        retrieves the outbound event from an outbound queue of the event bus;
            translates the outbound event into a format understood by the first event source; and
            transmits the translated outbound event to the first event source in its respective second computing cloud.

16. The computer system of claim 15 wherein the outbound event was placed in the outbound queue by the function in response to receiving an inbound event originating from the first event source.

17. The computer system of claim 16 wherein the outbound event includes a result of an execution of the function with respect to the inbound event.

18. The computer system of claim 15 wherein the outbound event was placed in the outbound queue by the function in response to receiving an inbound event originating from a second event source in another of the second computing clouds that is different from the first event source.

19. The computer system of claim 15 wherein the outbound event includes an instruction to write data to one or more storage locations in the second computing cloud of the first event source.

20. The computer system of claim 15 wherein the first event proxy further:
    receives an inbound event emitted by the first event source;
    translates the inbound event from the format understood by the first event source to another format understood by a function scheduler of the FaaS infrastructure; and
    places the translated inbound event in an inbound queue of the event bus.

21. The computer system of claim 20 wherein, upon detecting the translated inbound event in the inbound queue, the function scheduler:
    identifies the function as being subscribed to the translated inbound event or a type of the translated inbound event; and
    schedules the function for execution, the scheduling comprising passing the translated inbound event as an input parameter to the function.

* * * * *